United States Patent [19]

Shiono et al.

[11] Patent Number: 4,771,382
[45] Date of Patent: Sep. 13, 1988

[54] MASTER ECR FOR INTERROGATING THE STATE AND DATA CONTENTS OF A SLAVE ECR

[75] Inventors: Fusahiro Shiono, Habikino; Soichi Ohnishi, Yao, both of Japan

[73] Assignee: Sharp Kabushiki Kaisha, Osaka, Japan

[21] Appl. No.: 39,808

[22] Filed: Apr. 15, 1987

Related U.S. Application Data

[63] Continuation of Ser. No. 728,450, May 1, 1985, abandoned, which is a continuation of Ser. No. 370,296, Apr. 20, 1982, abandoned.

[30] Foreign Application Priority Data

Apr. 30, 1981 [JP] Japan .................................. 56-66716

[51] Int. Cl.4 ........................ G07G 1/14; G06F 15/21
[52] U.S. Cl. .................................................. 364/405
[58] Field of Search ...................... 364/404, 405, 408; 235/379

[56] References Cited

U.S. PATENT DOCUMENTS

| | | | |
|---|---|---|---|
| 4,091,448 | 5/1978 | Clausing ........................ | 235/379 X |
| 4,264,954 | 4/1981 | Briggs et al. ....................... | 364/200 |
| 4,319,326 | 3/1982 | Uchida ................................. | 364/405 |
| 4,360,872 | 11/1982 | Suzuki et al. ................... | 364/900 X |
| 4,388,689 | 6/1983 | Hayman et al. ................. | 364/404 X |
| 4,389,707 | 6/1983 | Tsuzuki .............................. | 364/405 |
| 4,398,250 | 8/1983 | Hosono .............................. | 364/404 |

FOREIGN PATENT DOCUMENTS

| | | | |
|---|---|---|---|
| 0044453 | 4/1979 | Japan ................................. | 364/405 |
| 0050251 | 4/1979 | Japan ................................. | 364/405 |
| 0044455 | 4/1979 | Japan ................................. | 364/405 |
| 0091069 | 7/1980 | Japan ................................. | 364/405 |

Primary Examiner—Jerry Smith
Assistant Examiner—Clark A. Jablon
Attorney, Agent, or Firm—Birch, Stewart, Kolasch and Birch

[57] ABSTRACT

An electronic cash register system of the register-in-line type includes a master machine and a plurality of slave machines which communicate with the master machine. A state determination system is included in each of the slave machines for storing a state indicating signal which indicates whether a reset operation or a read operation has already been conducted to the transaction data registered in the slave machine. When the transaction data is transmitted to the master machine, the state indicating signal is also transmitted to the master machine. Accordingly, the operator of the master machine can monitor the operational states of the respective slave machines.

5 Claims, 3 Drawing Sheets

4,771,382

MASTER ECR FOR INTERROGATING THE STATE AND DATA CONTENTS OF A SLAVE ECR

This application is a continuation of application Ser. No 728,450, filed on May 1, 1985, now abandoned, which in turn is a continuation of application Ser. No. 370,296, filed on Apr. 20, 1982, and now abandoned.

BACKGROUND AND SUMMARY OF THE INVENTION

The present invention relates to an electronic cash register system.

The present invention relates, more specifically, to a register-in-line system, wherein a master machine and a plurality of slave machines communicate with each other through a network system.

Each of the slave machines performs the registering of transaction data. The thus registered transaction data is transferred to the master machine at a desired time. In such a system, the master machine must check the operational condition of each of the slave machines.

Accordingly, an object of the present invention is to provide a data transfer control system in a register-in-line system.

Another object of the present invention is to provide a monitor system in a register-in-line system, wherein a master machine can check operational conditions of the slave machines.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a state memory is included in each of plurality of slave machines. The state memory shows conditions of the slave machine as to whether the reset operation or the read operation has already been conducted to the transaction data memorized in the slave machine. Such a reset operation is performed to clear the transaction data stored in the random access memory of the slave machine to begin the accumulation of data for a new time period. This reset mode is known in the art of electronic cash registers. The read operation is performed to accumulate or read data stored within the slave machine by the master machine. The state information stored in the state memory is transferred to the master machine when the transaction data registered by the slave machine is transferred to the master machine. Therefore, the operator of the master machine can check the condition of each of the slave machines. When the state information indicates that neither the reset operation nor the read operation has yet been conducted, the operator of the master machine controls the master machine to develop an instruction signal to conduct the reset operation or the read operation in the slave machine.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
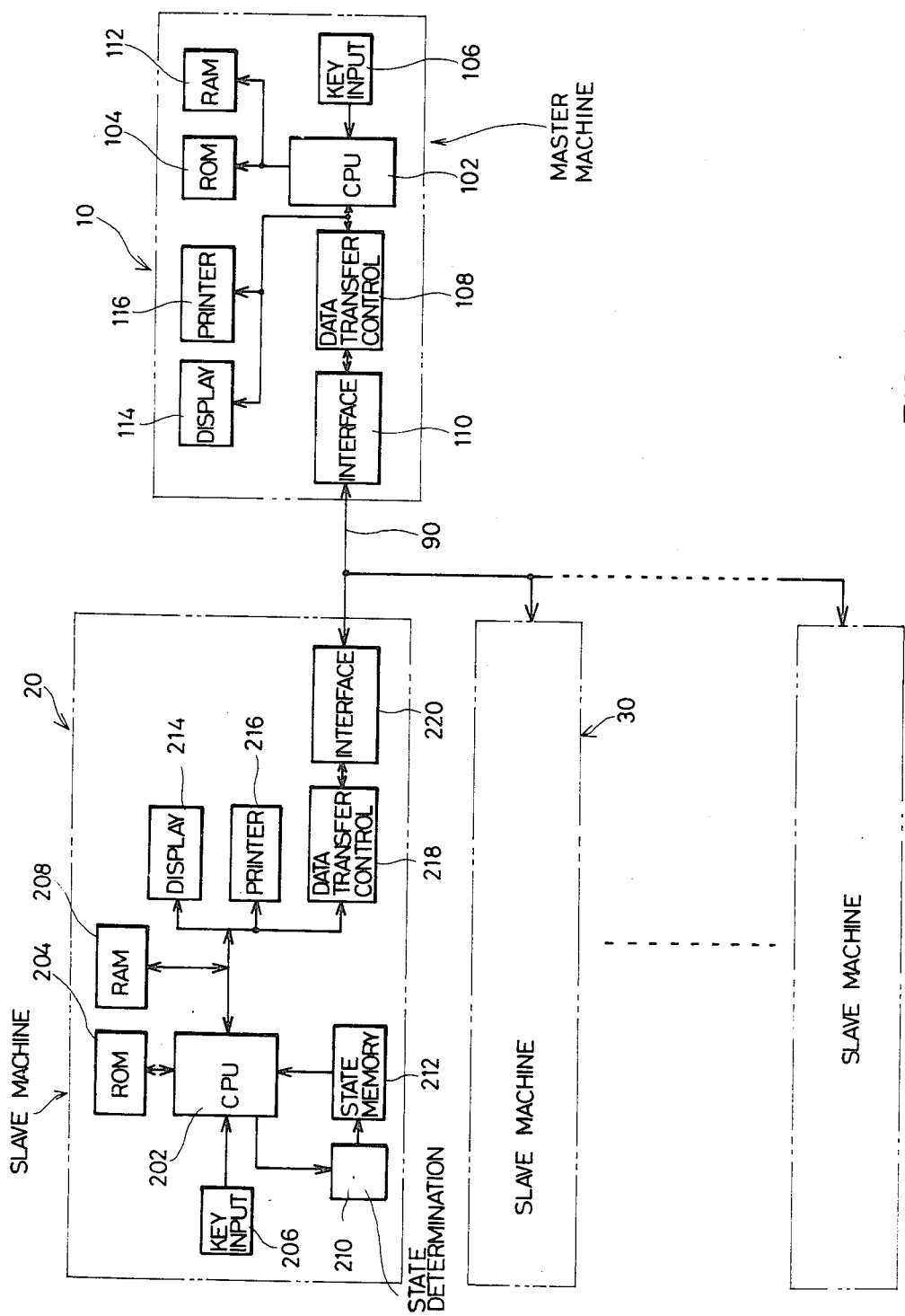
FIG. 1 is a block diagram of an embodiment of an electronic cash register system of the present invention.

An electronic cash register system of the present invention comprises a master machine 10, and a plurality of slave machines 20, 30, - - - which communicate with the master machine 10 via a line 90. Each of the slave machines 20, 30, - - - has the same construction and performs the registering operation of transaction data.

The master machine 10 includes a central processor unit 102 and a read only memory 104 for controlling the system operation. The master machine 10 further includes a keyboard panel 106 for introducing transaction data and for introducing a machine number of a desired slave machine in order to accumulate the transaction data registered in the slave machine. When the machine number of a desired slave machine is introduced into the central processor unit 102, the central processor unit 102 develops a data transfer request signal which is transmitted to the desired slave machine via a data transfer control circuit 108, an interface 110 and the line 90.

In response to the data transfer request signal transmitted from the master machine, the slave machine transmits the transaction data registered in the slave machine to the master machine. In accordance with the present invention, the slave machine further transmits a state indicating signal, which indicates whether the reset operation or the read operation has already been conducted to the transaction data, to the master machine 10. The thus transmitted transaction data and the state information are stored in a random access memory 112 included in the master machine 10. The contents stored in the random access memory 112 are displayed on a display unit 114 and printed on a journal paper or a receipt slip through the use of a printer 116.

The slave machine 20 includes a central processor unit 202 and a read only memory 204 for controlling the operation of the slave machine 20. The slave machine 20 further includes a keyboard panel 206 for registering transaction data. The transaction data introduced from the keyboard panel 206 is stored in a random access memory 208. The slave machine 20 performs the reset operation and the read operation on the transaction data stored in the random access memory 208. When the reset operation or the read operation is conducted to the transaction data stored in the random access memory 208, a reset completion state indicating signal or a read completion state indicating signal is developed from a state determination circuit 210. The thus developed state indicating signal is stored in a state memory 212. The slave machine 20 includes a display unit 214 for displaying the transaction data stored in the random access memory 208, and a printer 216 for printing out the transaction data stored in the random access memory 208.

When the above-mentioned data transfer request signal is transmitted from the master machine, the slave machine 20 transmits the transaction data stored in the random access memory 208 and the state indicating signal stored in the state memory 212 to the master machine via a data transfer control circuit 218, an interface 220 and the line 90.

Figure 2:
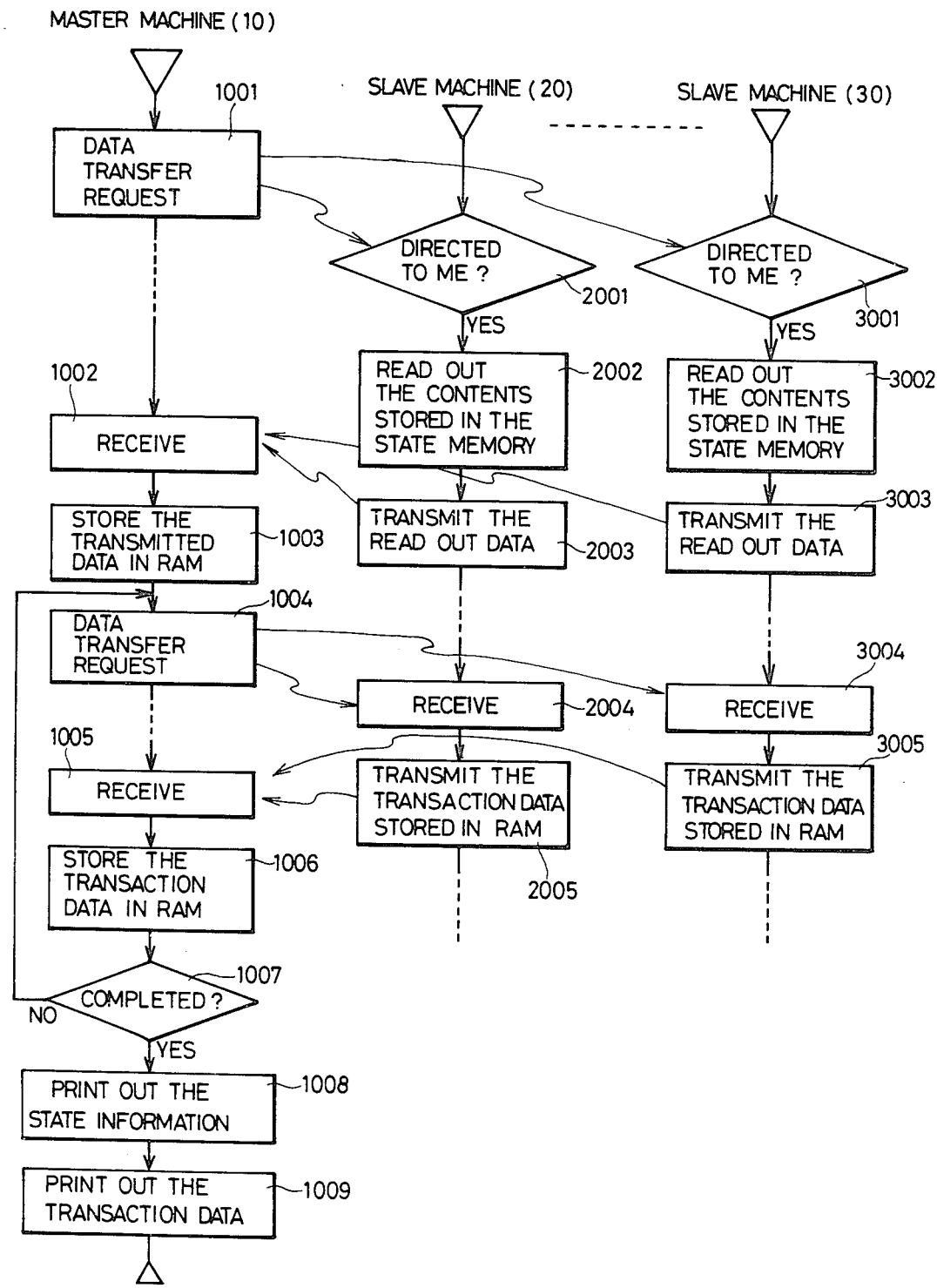
FIG. 2 is a flow chart for explaining an operational mode of the electronic cash register system of FIG. 1.

The data transfer operation between the master machine 10 and the slave machine (20, 30, - - -) is controlled in a manner shown in the flow chart of FIG. 2.

When the data transfer request is conducted by the operator of the master machine 10, that is, when a machine number of a desired slave machine is introduced from the keyboard panel 106, the data transfer request signal is developed from the central processor unit 102 (step 1001). The thus developed data transfer request signal is transmitted to each of the slave machines 20, 30, - - - via the line 90. The central processor unit 202 of each of the slave machines functions to check whether the data transfer request is conducted to the subject slave machine (step 2001, 3001, - - -). If the data transfer request is conducted to the subject slave machine, for example, to the slave machine 20, the slave machine 20 conducts the data transfer operation in accordance with the following program.

First, the state indicating signal stored in the state memory 212 is read out (step 2002) and the state indicating signal is transferred to the master machine 10 (step 2003). The master machine 10 stores the thus transmitted state indicating signal at a preselected memory section in the random access memory 112 (steps 1002 and 1003). Then, the master machine 10 transmits the transaction data transfer request signal to the slave machine 20 (step 1004). The central processor unit 202 functions to read out the transaction data stored in the random access memory 208. The transaction data is transmitted to the master machine 10 through the use of the central processor unit 202, the data transfer control circuit 218 and the interface 220 (steps 2004 and 2005).

The thus transmitted transaction data is introduced into and stored in a preselected memory section of the random access memory 112 (steps 1005 and 1006). When the transaction data transmission is completed (step 1007), the program is advanced to the following steps 1008 and 1009. At step 1008, state information indicative of whether the reset operation or the read operation has been conducted to the transaction data by the slave machine 20 is printed out onto the journal paper or the receipt slip through the use of the printer 116. At the step 1009, the transaction data stored in the random access memory 112 is printed out.

Figure 3:
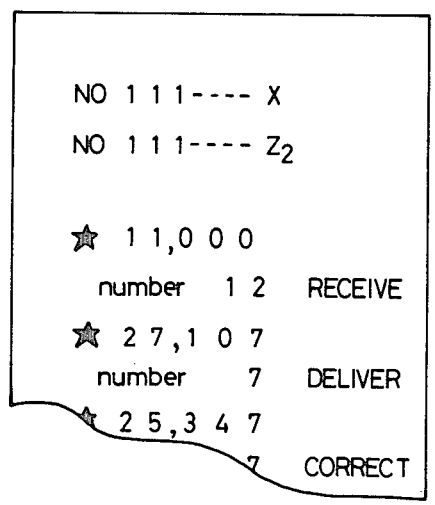
FIG. 3 is a plan view of an example of a printout developed by the electronic cash register system of FIG. 1.

FIG. 3 shows an example of a printout produced by the printer 116 of the master machine 10. The printout includes a symbol X for indicating the completion of the read operation at the slave machine, and another symbol $Z_2$ for indicating the completion of the reset operation at the slave machine with the machine number, for example, "111". Accordingly, the operator of the master machine can instruct the reset operation or the read operation for the respective slave machines with reference to the thus produced printout.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register system, comprising:
a master machine; and
a plurality of slave machines communicating with said master machine, each of said slave machines including,
input means for introducing transaction data therein,
transaction data memory means, responsive to said input means, for storing said transaction data,
processing control means for processing the transaction data introduced by said input means, said processing control means further monitoring the communication between said mater machine and said slave machine and determining whether a read or reset operation on said transaction data memory means is requested by said master machine, and
state memory means, responsive to the communication monitored by said processing control means, for storing a state indicating signal in said slave machine which indicates whether a read operation or a reset operation has been conducted to said transaction data stored in said transaction data memory means;
said master machine including,
means for developing a data transfer request, when desired, and for transmitting said request to said slave machine,
means for developing a transaction data memory means reset request, when desired, said processing control means of said slave machine conducting a reset operation by resetting said transaction data memory means in response to said transaction data memory means reset request form said master mashine,
data transfer control means, responsive to said data transfer request developed by said master machine, for transmitting said transaction data from said transaction data memory means of said slave machine to said master machine, and for transmitting said state indicating signal stored in said state memory means of said slave machine to said master machine,
memory means for temporarily storing said transaction data and said state indicating signal transmitted from said slave machine to said master machine by said data transfer control means, and
means for displaying said state indicating signal and said transaction data stored in said memory means, whereby said displayed state indicating signal indicates whether a reset or read operation has been conducted on said transaction data transferred from said slave machine.

2. The electronic cash register system of claim 1, wherein said master machine further includes a printer for printing out the transmitted transaction data on a paper medium and for printing a symbol representing a state indicated by said state indicating signal.

3. The electronic cash register system of claim 1, said slave machine further including a display unit for displaying said transaction data stored in said transaction data memory means.

4. A cash register system comprising:
at least one remote cash register means for accumulating transaction data;
master cash register means, operatively interconnected to said remote cash register means, for accumulating all said transaction data accumulated and transferred thereto by each said remote cash register means;

each said remote cash register means including,
  input means for introducing data into said remote cash register means,
  remote register memory means responsive to said introduced data for storing said data,
  means for resetting said remote register memory means in response to a reset request from said master cash register means,
  means for monitoring the transfer of data between said remote cash register means and said master cash register means and determining whether a read or reset operation has been conducted,
  state memory means responsive to said means for monitoring and determining for storing state information indicative of whether said read or reset operation has been conducted,
  means for transmitting said data stored in said remote register memory means and in said state memory means to said master cash register means in response to a data transfer request from said master cash register means;
said master cash register means including,
  means for developing a data transfer request, when desired, and for transmitting said request to said remote cash register means,
  means for temporarily storing data transferred by said remote cash register means,
  accumulator means for accumulating the data from said means for temporarily storing, said accumulator means having master memory means for storing said accumulated data and said state information,
  first means for developing an instruction signal for a read operation and for transmitting said operation to a said remote cash register means when a read operation is desired,
  second means for developing a an instruction signal for a reset operation and for transmitting said request to a said remote cash register means when a reset operation is desired, and
  means, responsive to said means for temporarily storing, for displaying said state information, whereby said displayed state information indicates whether a read or reset operation has been conducted on said remote cash register means;
said means for transmitting each of said remote cash register data and said state information is in response to receipt of said data transfer request.

5. An electronic cash register system, comprising:
a master machine; and
at least one slave machine communicating with said master machine, said at least one slave machine including,
  input means for introducing transaction data therein,
  transaction data memory means, responsive to said input means, for temporarily storing said transaction data,
  processing control means for processing the transaction data temporarily stored in said transaction data memory means, said processing control means further monitoring the communication between said master machine and said at least one slave machine, determining whether a read or reset operation is requested by said master machine, and performing said read or reset operation within said slave machine,
  said read operation including the accumulation of said transaction data in said transaction data memory means and said reset operation including the clearing of said transaction data in said transaction data memory means,
  state memory means, responsive to the communication monitored by said processing control means, for storing a state-indicating signal in said at least one slave machine which indicates whether a read operation or a reset operation was the most recent operation conducted on said transaction data temporarily stored in said transaction data memory means, and
  means for transferring said state-indicating signal from said state memory means of said at least one slave machine to said master machine;
said master machine including,
  means for developing a data transfer request, when desired, and for transmitting said request to said at least one slave machine,
  means for temporarily storing transaction data received from said transaction data memory means and said state-indicating signal received from said state memory means of said at least one slave machine,
  accumulation means for accumulating said transaction data and said state indicating signal from said means for temporarily storing,
  first means for transmitting an instruction signal for a read operation to said transaction data memory means of said at least one slave machine when a read operation is desired, and
  means, responsive to said means for temporarily storing, for displaying state information representative of said state-indicating signal, whereby said displayed state information indicates whether a read or reset operation was the most recent operation conducted on said transaction data temporarily stored in said transaction data memory means,
  said state information being displayed enabling an operator to determine whether or not said transaction data temporarily stored in said transaction data memory means has been independently reset by said slave machine, thereby an operator can instruct said reset operation or said read operation with reference to said state information being displayed.

* * * * *